United States Patent Office.

JULIUS HERBABNY, OF OFFENBACH-ON-THE-MAIN, GERMANY, ASSIGNOR TO K. OEHLER, ANILIN AND ANILINFARBEN-FABRIK, OF SAME PLACE.

CLARET-RED TETRAZO DYE.

SPECIFICATION forming part of Letters Patent No. 639,042, dated December 12, 1899.

Application filed July 19, 1899. Serial No. 724,341. (Specimens.)

*To all whom it may concern:*

Be it known that I, JULIUS HERBABNY, doctor of philosophy, residing at Offenbach-on-the-Main, in the Grand Duchy of Hesse, German Empire, have invented a new Claret-Red Tetrazo Dye, (for which the firm of K. Oehler has applied for Letters Patent in Germany, O. 3,066 IV/22$^a$, of January 12, 1899, and in England, No. 4,515, of March 1, 1899,) of which the following is a specification.

This invention relates to the manufacture of new dyestuffs deriving from the amido phenyl pyrazolone carbonic acid of the formula

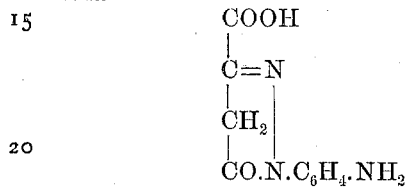

and dyeing vegetable fibers without mordants claret-red shades.

I have discovered that if tetrazotized paradiamins—such as benzidin, tolidin, dianisidin, diamidostilbene, and the like—be allowed to act upon two molecules of amido phenyl pyrazolone carbonic acid new direct coloring-matters result, the constitution of which may be shown by the general formula

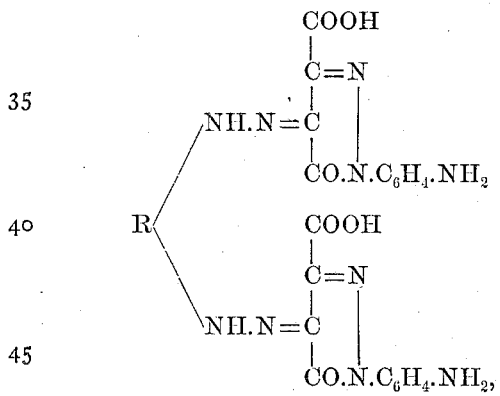

wherein "R" means a paradiamin. These dyestuffs dye vegetable fibers yellowish to bluish claret-red shades, which are distinguished by their fastness to light and washing. The new coloring-matters may also further be diazotized, either in substance or on the fiber, and then combined resp. developed with suitable color-producing agents, as amins, phenols, and the like.

For the practical carrying out of my invention I may, for instance, proceed as follows: Eleven kilos of tolidin or the equimolecular proportion of another of the above-cited diamins are dissolved in about three hundred parts of water and 28.5 kilos of hydrochloric acid 20° Baumé. The solution thus obtained is preferably cooled down by ice or otherwise to about 5° centigrade and then diazotized in the known manner by the addition of a concentrated aqueous solution containing 7.2 kilos of sodium nitrite. The resulting tetrazo body is then poured into an aqueous solution prepared from twenty-five kilos of amido phenyl pyrazolone carbonic acid, twenty-five kilos of sodium carbonate, and seven hundred parts of water and a corresponding amount of ice to keep the temperature low during the operation. The formation of the coloring-matter begins quickly and the dyestuff produced separates out as a dark claret-red precipitate. To complete the combination, the whole mass is allowed to stand for about twelve hours while stirring. It is then slowly heated up to about 80° centigrade, salted out, filtered, pressed, and dried. The same coloring-matters result if the combination be carried out, instead of an alkaline solution, in neutral or acid solution.

Now, what I claim, and desire to secure by Letters Patent, is the following:

1. As a new manufacture, the new direct claret-red coloring-matters, resulting from the action of a tetrazotized paradiamin upon amido pyrazolone carbonic acid, their constitution being represented by the general formula

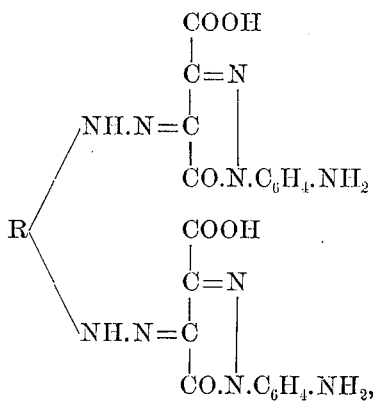

wherein "R" represents a paradiamin, and which are when in a dry state, brown to brown-black powders with a metallic luster, easily soluble in water with a bluish-red color and which dye unmordanted cotton claret-red shades which are fast to light and soap, substantially as herein described.

2. As a new article of manufacture the specific tetrazo dye herein described, resulting from the reaction of tetrazoditolyl upon amido phenyl pyrazolone carbonic acid, its constitution being shown by the formula

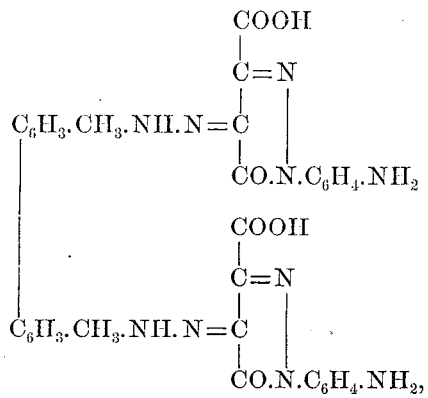

which dyes unmordanted cotton claret-red shades fast to washing and light, and which is in a dry state a brown to dark-brown powder with a metallic luster, easily soluble in water with a bluish-red color, and which produces in concentrated sulfuric acid a solution of a bluish-violet color from which on addition of a little water there are precipitated brown-red flocks which slightly dissolve even on addition of much water.

In testimony whereof I have signed my name to this specification in the presence of two subscribing witnesses.

JULIUS HERBABNY.

Witnesses:
JEAN GRUND,
ROBERT BÜHL.